United States Patent
Alanqari et al.

(10) Patent No.: US 11,624,020 B1
(45) Date of Patent: Apr. 11, 2023

(54) METHODS OF REDUCING LOST CIRCULATION IN A WELLBORE

(71) Applicant: Saudi Arabian Oil Company, Dhahran (SA)

(72) Inventors: Khawlah A. Alanqari, Al-Khubar (SA); Vikrant Wagle, Dhahran (SA); Abdullah Al-Yami, Dhahran (SA); Ali Al-Safran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/564,439

(22) Filed: Dec. 29, 2021

(51) Int. Cl.
| | | |
|---|---|---|
| *E21B 33/138* | (2006.01) | |
| *E21B 21/00* | (2006.01) | |
| *C09K 8/504* | (2006.01) | |
| *C09K 8/508* | (2006.01) | |
| *C04B 24/28* | (2006.01) | |
| *C04B 28/00* | (2006.01) | |

(52) U.S. Cl.
CPC .......... *C09K 8/5045* (2013.01); *C04B 24/281* (2013.01); *C04B 28/006* (2013.01); *C09K 8/5086* (2013.01); *E21B 21/003* (2013.01); *E21B 33/138* (2013.01)

(58) Field of Classification Search
None
See application file for complete search history.

(56) References Cited

U.S. PATENT DOCUMENTS

| | | |
|---|---|---|
| 8,157,009 B2 | 4/2012 | Patil et al. |
| 9,410,066 B2 | 8/2016 | Ghassemzadeh |
| 9,701,885 B2 | 7/2017 | Husein et al. |
| 9,828,293 B2 | 11/2017 | Yadav et al. |
| 9,932,510 B2 | 4/2018 | Walker et al. |
| 10,005,930 B2 | 6/2018 | Reddy |
| 10,081,755 B2 | 9/2018 | Ballard |
| 10,138,405 B2 | 11/2018 | Kulkarni et al. |
| 10,144,858 B2 | 12/2018 | Kennedy et al. |
| 2020/0071598 A1* | 3/2020 | Al-Yami ................ C09K 8/501 |
| 2020/0131427 A1* | 4/2020 | Alsaihati .................. C04B 7/13 |
| 2021/0292231 A1* | 9/2021 | Alanqari ............... C04B 24/281 |

* cited by examiner

*Primary Examiner* — Andrew Sue-Ako
(74) *Attorney, Agent, or Firm* — Dinsmore & Shohl LLP

(57) ABSTRACT

A method of reducing lost circulation includes introducing a lost circulation solution comprising Saudi Arabian volcanic ash, a curing agent, and a resin into a subsurface formation through a wellbore, wherein the Saudi Arabian volcanic ash comprises $SO_3$, $CaO$, $SiO_2$, $Al_2O_3$, $Fe_2O_3$, $MgO$, and $K_2O$; and allowing the lost circulation solution to thicken within the subsurface formation, thereby forming a barrier between the subsurface formation and the wellbore to reduce lost circulation.

16 Claims, No Drawings

METHODS OF REDUCING LOST CIRCULATION IN A WELLBORE

TECHNICAL FIELD

Embodiments of the present disclosure generally relate to methods of reducing lost circulation.

BACKGROUND

Drilling fluid loss—commonly referred to as lost circulation—is a significant problem in the oil and gas industry. Lost circulation arises from wellbore drilling that penetrates into geological formations that are fractured, cavernous, vugular, underpressured, or highly permeable, such as those with a permeability greater than 100 Darcys. Lost circulation is typically classified into four volumetric loss rate categories or zones, depending on the amount of fluid lost per unit of time: seepage losses are those associated with the loss of less than about 10 barrels per hour; partial losses are those associated with the loss of between about 10 barrels per hour and about 100 barrels per hour; severe losses are those associated with the loss of over about 100 barrels per hour; while total losses are those where no fluid returns to the surface of the wellbore and that typically necessitate abandoning the well. Typically, the sizes of these geological voids can be correlated to whether the potential for drilling fluid loss fits into one of these four categories.

Lost circulation can be prevented in some circumstances through the use of pre-drilling geomechanical models and related analytical tools, as well as through the use of reinforced wellbore wall and related strengthening. In circumstances where such preventive measures do not provide ample protection against lost circulation, a loss control material (or lost circulation material, LCM) may be introduced as an LCM pill or via the drilling fluid as a remediation approach.

Conventional LCMs can include bridging material, fibrous material, flaky material, cement, and other materials having different particle sizes. While these materials may be effective at mediating many lost circulation zones, these conventional materials are not effective for use as LCM in severe loss circulation zones. As a result, there is a need for LCMs that are injectable into high-injectivity zones to remediate lost circulation conditions. The present disclosure addresses these needs by developing a new resin based LCM with a coarse Saudi Arabian volcanic ash to cure moderate to severe losses. The developed formulation has produced lost circulation material with controlled viscosity and setting time and with coarse volcanic ash particulates that help in building up the viscosity and contributes to the plugging of the loss circulation zone.

SUMMARY

Lost circulation encountered while drilling is a major problem in the oil and gas industry that is difficult to combat in severe loss zones. The LCMs typically introduced into the wellbore to combat severe losses are cheap, easy to access materials. These small LCMs may be easily dislodged from the wellbore fractures and allow further fluid loss instead of packing the fractures and effectively preventing fluid loss. However, these materials are typically individual rubber particles that are not adhered to each other, or, if there is an adhesive, the rubber particles adhered to each other are not capable of adhering to the subsurface formation and are not formed downhole within the subsurface formation, thereby formed within the fractures and blocking fluid loss. These conventional materials are not engineered for the specific purpose of remediating severe losses, and therefore are not effective at blocking the severe zone.

Accordingly, an improved approach to reducing or eliminating the loss of drilling fluid for such severe loss zones is warranted. The present embodiments address these needs by providing methods of forming an LCM between a wellbore and subsurface formations that include Saudi Arabian volcanic ash to serve as an extender to decrease the density and increase the yield point of the geopolymer barrier.

In one embodiment, a method of reducing lost circulation is provided. The method includes introducing a lost circulation solution comprising Saudi Arabian volcanic ash, a curing agent, and a resin into a subsurface formation through a wellbore, wherein the Saudi Arabian volcanic ash comprises $SO_3$, $CaO$, $SiO_2$, $Al_2O_3$, $Fe_2O_3$, $MgO$, and $K_2O$; and allowing the lost circulation solution to thicken within the subsurface formation, thereby forming a barrier between the subsurface formation and the wellbore to reduce lost circulation.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "geopolymer barrier" refers to the lost circulation solution comprising Saudi Arabian volcanic ash after the lost circulation solution sets or thickens.

As used throughout this disclosure, the term "consistency" refers to a rheological property of matter related to the cohesion of the individual particles of a given material, its ability to deform and its resistance to flow. The consistency of the geopolymer barrier is determined by thickening time tests in accordance with API Recommended Practice 10B and is expressed in Bearden units of consistency (Bc), a dimensionless quantity with no direction conversion factor to more common units of viscosity. The Bearden units of consistency is measured on a scale from 1 to 100 where, conventionally, difficult pumping is thought to begin at 50 Bc, and cement is completely set at 100 Bc.

As used throughout this disclosure, the term "curing" refers to providing adequate moisture, temperature and time to allow the concrete to achieve the desired properties (such as hardness) for its intended use through one or more reactions between the water and the Saudi Arabian volcanic ash.

As used throughout this disclosure, the term "drying" refers to merely allowing the cement to achieve a moisture condition appropriate for its intended use, which may only involve physical state changes, as opposed to chemical reactions.

As used throughout this disclosure, the term "extender" refers to a cement extender, that is, a chemical additive or inert material used to decrease the density of a geopolymer barrier and increase the yield point. Reducing the slurry density reduces the hydrostatic pressure of the cement column in the wellbore, leading to successful wellbore isolation.

As used throughout this disclosure, the term "free of" as used to describe any chemical or component refers to not including more than trace amounts of the chemical or component, where trace amounts refers to having less than 0.1% of the chemical or component.

As used throughout this disclosure, the term "kick" is used to describe a flow of formation fluids into the wellbore during drilling operations. The kick is physically caused by the pressure in the wellbore being less than that of the formation fluids, thus causing flow. This condition of lower wellbore pressure than the formation is caused in two ways. First, if the mud weight is too low, then the hydrostatic pressure exerted on the formation by the fluid column may be insufficient to hold the formation fluid in the formation. This can happen if the mud density is suddenly decreased or if a drilled formation has a higher pressure than anticipated. This type of kick might be called an underbalanced kick. The second way a kick can occur is if dynamic and transient fluid pressure effects, usually due to motion of the drillstring or casing, effectively lower the pressure in the wellbore below that of the formation. This second kick type could be called an induced kick.

As used throughout this disclosure, the term "plastic viscosity" refers to the slope of the shear stress/shear rate line greater than the yield point. Plastic viscosity represents the viscosity of a fluid when extrapolated to infinite shear rate. Plastic viscosity is increased by a viscous base fluid and by excess colloidal solids.

As used throughout this disclosure, the term "point of departure" refers to the beginning of thickening of a geopolymer barrier during the thickening-time test, and is often abbreviated as POD. For some geopolymer barriers, the POD is used as the thickening time.

As used throughout this disclosure, the term "retarder" refers to a chemical agent used to increase the thickening time of geopolymer barrier to enable proper placement. The need for cement retardation increases with depth due to the greater time required to complete the cementing operation and the effect of increased temperature on the cement-setting process.

As used throughout this disclosure, the term "Saudi Arabian volcanic ash" refers to volcanic ash originally acquired from Saudi Arabia.

As used throughout this disclosure, the term "shear stress" refers to the force per unit area required to sustain a constant rate of fluid movement.

As used throughout this disclosure, the term "shear rate" refers to the rate of change of velocity at which one layer of fluid passes over an adjacent layer.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "thickening time" refers to a measurement of the time during which a geopolymer barrier remains in a fluid state and is capable of being pumped. Thickening time is assessed under downhole conditions using a pressurized consistometer that plots the viscosity of a slurry over time under the anticipated temperature and pressure conditions. The end of the thickening time is conventionally about 50 or 70 Bc.

As used throughout this disclosure, the term "wellbore" refers to the drilled hole or borehole, including the openhole or uncased portion of the well. Borehole may refer to the inside diameter of the wellbore wall, the rock face that bounds the drilled hole.

As used throughout this disclosure, the term "yield point" refers to the point in the stress-strain curve at which the curve levels off and plastic deformation begins to occur. Yield point is used to evaluate the void filling properties of cements and the ability of a cement to flow through the annulus. A greater yield point implies a non-Newtonian fluid, one that flows more uniformly than a fluid of similar density but lesser yield point. Yield point is increased by adding freshly dispersed clay or a flocculant, such as lime.

Embodiments of the present disclosure relate to methods of reducing lost circulation in a wellbore. The wellbore may serve to connect subsurface natural resources, such as petrochemical products, to a ground level surface. In some embodiments, a wellbore may be formed in the subsurface formation, which may be formed by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, drilling fluid may be utilized during the drilling process. To remove the rock cuttings from the bottom of the wellbore, drilling fluid is pumped down through the drill string to the drill bit. The drilling fluid cools the drill bit and lifts the rock cuttings away from the drill bit and carries the rock cuttings upwards as the drilling fluid is recirculated back to the surface.

As discussed previously, lost circulation is typically classified into four volumetric loss rate categories: seepage losses, partial losses, severe losses, and total losses. Typically, the size of these geological voids can be correlated to whether the potential for drilling fluid loss fits into one of these four zones. These geological voids, or fractures, may be measured by running logs down the annulus to determine the opening size of the fractures. During the drilling process, severe loss zones may be encountered. As used throughout this disclosure, the term "severe loss zone" refers to a lost circulation zone wherein the amount of fluids lost per hour falls into the severe losses category. Severe loss zones may be found in fractured, cavernous, vugular, underpressured, or highly permeable formations, such as those with a permeability greater than 100 darcys. As used throughout this disclosure, the term "underpressured" refers to a formation with a pore pressure that is less than hydrostatic pressure. However, severe loss zones do not include impermeable or low permeability zones, overpressured zones, or deep sand.

This application discloses a method of reducing lost circulation by forming a geopolymer barrier between the wellbore and the subsurface formation. To ensure the stability and safety of a well, it is important that the geopolymer barrier maintains integrity and isolates the wellbore from the surrounding subsurface formations. If the geopolymer barrier cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid or hydrocarbon fluid loss from the wellbore into the surrounding subsurface formation, or in decreased wellbore pressure, possibly leading to a well control event. Therefore, wellbore integrity and isolation are critical to efficient production and use of a wellbore.

The lost circulation solution includes a curing agent, a resin, and Saudi Arabian volcanic ash. The curing agent may include a crosslinker. A crosslinker is a substance or agent that induces the subsurface formation of crosslinks. Mixing an unpolymerized or partially polymerized resin with a crosslinker results in a chemical reaction that crosslinks the resin. In some embodiments, the fluorinated polyols may function as a crosslinker. The degree of crosslinking may be controlled by the molar or weight ratio of crosslinker to monomer. In some embodiments, the crosslinker may include diethylenetriamine, hexamethylenetetramine, paraformaldehyde, oxazolidines, melamine resins, aldehyde donors, resole polymers, or combinations thereof. The lost circulation solution may include from 1 to 5 wt. %, from 1 to 4 wt. %, from 1 to 3.5 wt. %, from 1 to 3 wt. %, from 1 to 2.5 wt. %, from 1 to 2 wt. %, from 1 to 1.5 wt. %, from 1.5 to 5 wt. %, from 1.5 to 4 wt. %, from 1.5 to 3.5 wt. %, from 1.5 to 3 wt. %, from 1.5 to 2.5 wt. %, from 1.5 to 2 wt. %, from 2 to 5 wt. %, from 2 to 4 wt. %, from 2 to 3.5 wt. %, from 2 to 3 wt. %, from 2 to 2.5 wt. %, from 2.5 to 5 wt. %, from 2.5 to 4 wt. %, from 2.5 to 3.5 wt. %, from 2.5 to 3 wt. %, from 3 to 5 wt. %, from 3 to 4 wt. %, from 3 to 3.5 wt. %, from 3.5 to 5 wt. %, from 3.5 to 4 wt. %, from 4 to 5 wt. %, or approximately 2.5 wt. % curing agent by weight of the lost circulation solution.

Resin is a solid or viscous substance of plant or synthetic origin that is typically convertible into polymers, and may be a mixture of organic compounds such as terpenes, an organic compound produced by plants. The viscosity of resin may be greater than 20 centiPoise (cP), measured at a temperature of 120° C. In one embodiment, the resin may have no additional additives. The resin may comprise at least one of phenol, furan, epoxy, urethane, phenol-formaldehyde, polyester, vinyl ester, and urea aldehyde. The resin may comprise phenol-formaldehyde. The phenol-formaldehyde resin may comprise novolac or resole. Novolacs are phenol-formaldehyde resins with a formaldehyde to phenol molar ratio of less than 1, where the phenol units are mainly linked by methylene or ether groups, or both. The novolac polymer may have a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol. The novolac polymer comprises a glass transition temperature greater than 250° F., 300° F., 350° F., 390° F., 400° F., 450° F., or 500° F. Novolacs are stable, meaning that novolacs do not react and do retain their polymer properties at temperatures of up to 300° F., 400° F., 425° F., 450° F., 475° F., 500° F., 550° F., or 600° F. Resoles are phenol-formaldehyde resins with a formaldehyde to phenol molar ratio of more than 1, where the phenol units are mainly linked by methylene or ether groups, or both. This can harden without the addition of a crosslinking agent due to abundance of methylene to bridge the phenol groups. The resole may have a molecular weight of from 1,000 to 100,000 g/mol, from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol. The lost circulation solution may include from 50 to 90 wt. %, from 50 to 80 wt. %, from 50 to 75 wt. %, from 50 to 70 wt. %, from 50 to 65 wt. %, from 50 to 60 wt. %, from 60 to 90 wt. %, from 60 to 80 wt. %, from 60 to 75 wt. %, from 60 to 70 wt. %, from 60 to 65 wt. %, from 65 to 90 wt. %, from 65 to 80 wt. %, from 65 to 75 wt. %, from 65 to 70 wt. %, from 70 to 90 wt. %, from 70 to 80 wt. %, from 70 to 75 wt. %, from 75 to 90 wt. %, from 75 to 80 wt. %, from 80 to 90 wt. %, or approximately 70 wt. % resin by weight of the lost circulation solution.

In some embodiments, the lost circulation solution may contain at least one additive. The one or more additives may be any additives known to be suitable for lost circulation solutions. As non-limiting examples, suitable additives may include fluid loss control agents, lost circulation control agents, filtration control additives, antifoaming agents, emulsifiers, weighting agent, fluid loss additives, an alkali reserve, specialty additives, and combinations thereof.

In some embodiments, the one or more additives may include a viscosifier, also referred to as a rheology modifier, which may be added to the lost circulation solution to impart non-Newtonian fluid rheology to the lost circulation solution to facilitate lifting and conveying rock cuttings to the surface of the wellbore. The viscosifier may include bentonite, polyacrylamide, polyanionic cellulose, or combinations thereof. In some embodiments, the lost circulation solution may include xanthan gum, a polysaccharide commonly referred to XC polymer. The XC polymer may be added to the water-based lost circulation solution to produce a flat velocity profile of the water-based lost circulation solution in annular flow, which may help to improve the efficiency of the lost circulation solution in lifting and conveying rock cuttings to the surface.

In some embodiments, the lost circulation solution may contain from 0.01 wt. % to 20 wt. % of the one or more additives based on the total weight of the lost circulation solution. The lost circulation solution may contain from 0.02 lb/bbl to 180 lb/bbl of the one or more additives based on the total weight of the lost circulation solution, such as from 0.02 to 150 lb/bbl, or from 0.05 to 150 lb/bbl. In some embodiments, the lost circulation solution may contain from 0.1 to 150 lb/bbl, or from 0.1 to 100 lb/bbl, or from 1 to 100 lb/bbl of the one or more additives.

The lost circulation solution may include at least one weighting agent. In embodiments, the lost circulation solution may be a drilling fluid. The weighting agent may be chosen from the group consisting of manganese oxide ($Mn_3O_4$), ferrosilicon, hausmannite, lime (CaO), calcium carbonate ($CaCO_3$), bentonite, montmorillonite clay, siderite ($FeCO_3$), ilmenite ($FeO.TiO_3$), barium sulfate (barite, ($BaSO_4$)), hematite ($Fe_2O_3$), mullite ($3Al_2O_3.2SiO_2$ or $2Al_2O_3.SiO_2$), kaolin ($Al_2Si_2O_5(OH)_4$ or kaolinite), alumina ($Al_2O_3$, or aluminum oxide), silicon carbide, tungsten carbide, and combinations thereof.

In some embodiments, the lost circulation solution may contain from 0.01 wt. % to 20 wt. % of the at least one weighting agent based on the total weight of the lost circulation solution. The lost circulation solution may contain from 0.02 pounds per barrel (lb/bbl) to 180 lb/bbl of the one or more additives based on the total weight of the lost circulation solution, such as from 0.02 to 150 lb/bbl, or from 0.05 to 150 lb/bbl. In some embodiments, the lost circulation solution may contain from 0.1 to 150 lb/bbl, or from 0.1 to 100 lb/bbl, or from 1 to 100 lb/bbl of the one or more additives.

In some embodiments, the at least one weighting agent may include solids, which may be dispersed in the lost circulation solution. The solids may be finely divided solids that may be added to the lost circulation solution to increase the density of the lost circulation solution. The solids may have a density of from 1 to 10 grams per centimeter cubed (g/cm³), from 2 to 10 g/cm³, from 3 to 10 g/cm³, from 4 to 10 g/cm³, from 4.5 to 10 g/cm³, from 5 to 10 g/cm³, from 6 to 10 g/cm³, from 8 to 10 g/cm³, from 1 to 8 g/cm³, from 2 to 8 g/cm³, from 3 to 8 g/cm³, from 4 to 8 g/cm³, from 4.5 to 8 g/cm³, from 5 to 8 g/cm³, from 6 to 8 g/cm³, from 1 to 6 g/cm³, from 2 to 6 g/cm³, from 3 to 6 g/cm³, from 4 to 6 g/cm³, from 4.5 to 6 g/cm³, from 5 to 6 g/cm³, from 1 to 5 g/cm³, from 2 to 5 g/cm³, from 3 to 5 g/cm³, from 4 to 5 g/cm³, from 4.5 to 5 g/cm³, from 1 to 4.5 g/cm³, from 2 to 4.5 g/cm³, from 3 to 4.5 g/cm³, from 4 to 4.5 g/cm³, from 1 to 4 g/cm³, from 2 to 4 g/cm³, from 3 to 4 g/cm³, from 1 to 3 g/cm³, or from 2 to 3 g/cm³.

In embodiments, the lost circulation solution may have a solids content of from 1 wt. % to 80 wt. % based on the weight of the solid weighing material based on the total weight of the lost circulation solution. The lost circulation solution may have a solids content of from 2.5 lb/bbl to 720 lb/bbl, such as from 2.5 to 720 lb/bbl, or 2.5 to 700 lb/bbl. In some embodiments, the lost circulation solution may have a solids content of from 5 to 700 lb/bbl, from 50 to 500 lb/bbl, or from 100 to 600 lb/bbl.

As stated, the addition of solids may be used to control the density of the lost circulation solution. In some embodiments, the lost circulation solution may have a density of from 50 pounds of mass per cubic foot (pcf) to 160 pcf, as measured using a mud balance in accordance with the American Petroleum Institute (API) recommended practice 13B-2. The lost circulation solution may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the lost circulation solution may have a density of from 50 pcf to 75 pcf, or from 75 pcf to 100 pcf, or from 120 pcf to 160 pcf. In some embodiments, mud weights less than 100 pcf may be used when drilling depleted formations.

The method further includes introducing Saudi Arabian volcanic ash into the wellbore. In embodiments, the method may include mixing the lost circulation solution and the Saudi Arabian volcanic ash prior to introducing both the lost circulation solution and the Saudi Arabian volcanic ash into the wellbore. In embodiments, the method may include allowing the Saudi Arabian volcanic ash to contact the lost circulation solution in the wellbore.

The Saudi Arabian volcanic ash may have a particle size from 200 to 1000 μm, from 200 to 900 μm, from 200 to 800 μm, from 200 to 700 μm, from 200 to 600 μm, from 200 to 550 μm, from 200 to 500 μm, from 200 to 450 μm, from 200 to 400 μm, from 200 to 350 μm, from 200 to 300 μm, from 300 to 1000 μm, from 300 to 900 μm, from 300 to 800 μm, from 300 to 700 μm, from 300 to 600 μm, from 300 to 550 μm, from 300 to 500 μm, from 300 to 450 μm, from 300 to 400 μm, from 300 to 350 μm, from 350 to 1000 μm, from 350 to 900 μm, from 350 to 800 μm, from 350 to 700 μm, from 350 to 600 μm, from 350 to 550 μm, from 350 to 500 μm, from 350 to 450 μm, from 350 to 400 μm, from 400 to 1000 μm, from 400 to 900 μm, from 400 to 800 μm, from 400 to 700 μm, from 400 to 600 μm, from 400 to 550 μm, from 400 to 500 μm, from 400 to 450 μm, from 450 to 1000 μm, from 450 to 900 μm, from 450 to 800 μm, from 450 to 700 μm, from 450 to 600 μm, from 450 to 550 μm, from 450 to 500 μm, from 500 to 1000 μm, from 500 to 900 μm, from 500 to 800 μm, from 500 to 700 μm, from 500 to 600 μm, from 500 to 550 μm, from 550 to 1000 μm, from 550 to 900 μm, from 550 to 800 μm, from 550 to 700 μm, from 550 to 600 μm, from 600 to 1000 μm, from 600 to 900 μm, from 600 to 800 μm, from 600 to 700 μm, from 650 to 1000 μm, from 650 to 900 μm, from 650 to 800 μm, from 650 to 700 μm, from 700 to 1000 μm, from 700 to 900 μm, from 700 to 800 μm, from 800 to 1000 μm, from 800 to 900 μm, or from 900 to 1000 μm. The value of particle size distribution $D_X$ indicates that X % of the particles are under that particle size. In embodiments, the Saudi Arabian volcanic ash may have a particle size distribution $D_{10}$ of from 200 to 500 μm, from 200 to 450 μm, from 200 to 400 μm, from 200 to 350 μm, from 200 to 300 μm, from 300 to 500 μm, from 300 to 450 μm, from 300 to 400 μm, from 300 to 350 μm, from 350 to 500 μm, from 350 to 450 μm, from 350 to 400 μm, from 400 to 500 μm, from 400 to 450 μm, or from 450 to 500 μm. In embodiments, the Saudi Arabian volcanic ash may have a particle size distribution $D_{50}$ of from 400 to 700 μm, from 400 to 650 μm, from 400 to 600 μm, from 400 to 550 μm, from 400 to 500 μm, from 400 to 450 μm, from 450 to 700 μm, from 450 to 650 μm, from 450 to 600 μm, from 450 to 550 μm, from 450 to 500 μm, from 500 to 700 μm, from 500 to 650 μm, from 500 to 600 μm, from 500 to 550 μm, from 550 to 700 μm, from 550 to 650 μm, from 550 to 600 μm, or from 600 to 700 μm. In embodiments, the Saudi Arabian volcanic ash may have a particle size distribution $D_{90}$ of from 700 to 1000 μm, from 700 to 900 μm, from 700 to 800 μm, from 800 to 1000 μm, from 800 to 900 μm, or from 900 to 1000 μm. The Saudi Arabian volcanic ash is free of $TiO_2$. The Saudi Arabian volcanic ash may comprise from 0.05 to 2 wt. %, from 0.05 to 1 wt. %, from 0.05 to 0.8 wt. %, from 0.05 to 0.5 wt. %, from 0.05 to 0.2 wt. %, from 0.05 to 0.15 wt. %, from 0.05 to 0.1 wt. %, from 0.1 to 2 wt. %, from 0.1 to 1 wt. %, from 0.1 to 0.8 wt. %, from 0.1 to 0.5 wt. %, from 0.1 to 0.2 wt. %, from 0.1 to 0.15 wt. %, from 0.15 to 2 wt. %, from 0.15 to 1 wt. %, from 0.15 to 0.8 wt. %, from 0.15 to 0.5 wt. %, from 0.15 to 0.2 wt. %, from 0.2 to 2 wt. %, from 0.2 to 1 wt. %, from 0.2 to 0.8 wt. %, or from 0.2 to 0.5 wt. % $SO_3$. More specifically, the Saudi Arabian volcanic ash may comprise from 0.05 to 0.2 wt. % $SO_3$, from 5 to 10 wt. % CaO, from 40 to 50 wt. % $SiO_2$, from 10 to 20 wt. % $Al_2O_3$, from 10 to 15 wt. % $Fe_2O_3$, from 5 to 10 wt. % MgO, and from 0.5 to 5 wt. % $K_2O$. The geopolymer barrier may include from 2 to 80 wt. % BWOV, from 5 to 80 wt. % BWOV, from 8 to 80 wt. % BWOV, from 15 to 80 wt. % BWOV, from 25 to 80 wt. % BWOV, from 40 to 80 wt. % BWOV, from 50 to 80 wt. % BWOV, from 60 to 80 wt. % BWOV, from 2 to 60 wt. % BWOV, from 5 to 60 wt. % BWOV, from 8 to 60 wt. % BWOV, from 15 to 60 wt. % BWOV, from 25 to 60 wt. % BWOV, from 40 to 60 wt. % BWOV, from 50 to 60 wt. % BWOV, from 2 to 50 wt. % BWOV, from 5 to 50 wt. % BWOV, from 8 to 50 wt. % BWOV, from 15 to 50 wt. % BWOV, from 25 to 50 wt. % BWOV, from 40 to 50 wt. % BWOV, from 2 to 40 wt. % BWOV, from 5 to 40 wt. % BWOV, from 8 to 40 wt. % BWOV, from 15 to 40 wt. % BWOV, from 25 to 40 wt. % BWOV, from 2 to 25 wt. % BWOV, from 5 to 25 wt. % BWOV, from 8 to 25 wt. % BWOV, from 15 to 25 wt. % BWOV, from 2 to 15 wt. % BWOV, from 5 to 15 wt. % BWOV, from 8 to 15 wt. % BWOV, from 2 to 8 wt. % BWOV, or from 5 to 8 wt. % BWOV Saudi Arabian volcanic ash.

The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % CaO. The Saudi Arabian volcanic ash may comprise from 30 to 70 wt. %, from 30 to 60 wt. %, from 30 to 55 wt. %, from 30 to 50 wt. %, from 30 to 45 wt. %, from 30 to 40 wt. %, from 35 to 70 wt. %, from 35 to 60 wt. %, from 35 to 55 wt. %, from 35 to 50 wt. %, from 35 to 45 wt. %, from 35 to 40 wt. %, from 40 to 70 wt. %, from 40 to 60 wt. %, from 40 to 55 wt. %, from 40 to 50 wt. %, from 40 to 45 wt. %, from 45 to 70 wt. %, from 45 to 60 wt. %, from 45 to 55 wt. %, from 45 to 50 wt. %, from 50 to 70 wt. %, from 50 to 60 wt. %, or from 50 to 55 wt. % $SiO_2$. The Saudi Arabian volcanic ash may comprise from 2 to 40 wt. %, from 2 to 35 wt. %, from 2 to 30 wt. %, from 2 to 25 wt. %, from 2 to 20 wt. %, from 2 to 15 wt. %, from 2 to 10 wt. %, from 2 to 5 wt. %, from 5 to 40 wt. %, from 5 to 35 wt. %, from 5 to 30 wt. %, from 5 to 25 wt. %, from 5 to 20 wt. %, from 5 to 15 wt. %, from 5 to 10 wt. %, from 10 to 40 wt. %, from 10 to 35 wt. %, from 10 to 30 wt. %, from 10 to 25 wt. %, from 10 to 20 wt. %, from 10 to 15 wt. %, from 15 to 40 wt. %, from 15 to 35 wt. %, from 15 to 30 wt. %, from 15 to 25 wt. %, from 15 to 20 wt. %, from 20 to 40 wt. %, from 20 to 35 wt. %, from 20 to 30 wt. %, from 20 to 25 wt. % $Al_2O_3$. The Saudi Arabian volcanic ash may comprise from 2 to 30 wt. %, from 2 to 25 wt. %, from 2 to 20 wt. %, from 2 to 15 wt. %, from 2 to 13 wt. %, from 2 to 10 wt. %, from 2 to 8 wt. %, from 2 to 5 wt. %, from 5 to 30 wt. %, from 5 to 25 wt. %, from 5 to 20 wt. %, from 5 to 15 wt. %, from 5 to 13 wt. %, from 5 to 10 wt. %, from 5 to 8 wt. %, from 8 to 30 wt. %, from 8 to 25 wt. %, from 8 to 20 wt. %, from 8 to 15 wt. %, from 8 to 13 wt. %, from 8 to 10 wt. %, from 10 to 30 wt. %, from 10 to 25 wt. %, from 10 to 20 wt. %, from 10 to 15 wt. %, from 10 to 13 wt. %, from 13 to 30 wt. %, from 13 to 25 wt. %, from 13 to 20 wt. %, from 13 to 15 wt. %, from 15 to 30 wt. %, from 15 to 25 wt. %, or from 15 to 20 wt. % $Fe_2O_3$. The Saudi Arabian volcanic ash may comprise from 2 to 25 wt. %, from 2 to 20 wt. %, from 2 to 15 wt. %, from 2 to 10 wt. %, from 2 to 8 wt. %, from 2 to 5 wt. %, from 5 to 25 wt. %, from 5 to 20 wt. %, from 5 to 15 wt. %, from 5 to 10 wt. %, from 5 to 8 wt. %, from 8 to 25 wt. %, from 8 to 20 wt. %, from 8 to 15 wt. %, from 8 to 10 wt. %, from 10 to 25 wt. %, from 10 to 20 wt. %, or from 10 to 15 wt. % MgO. The Saudi Arabian volcanic ash may comprise from 0.2 to 10 wt. %, from 0.2 to 7 wt. %, from 0.2 to 5 wt. %, from 0.2 to 3 wt. %, from 0.2 to 2 wt. %, from 0.2 to 1 wt. %, from 0.2 to 0.5 wt. %, from 0.5 to 10 wt. %, from 0.5 to 7 wt. %, from 0.5 to 5 wt. %, from 0.5 to 3 wt. %, from 0.5 to 2 wt. %, from 0.5 to 1 wt. %, from 1 to 10 wt. %, from 1 to 7 wt. %, from 1 to 5 wt. %, from 1 to 3 wt. %, from 1 to 2 wt. %, from 2 to 10 wt. %, from 2 to 7 wt. %, from 2 to 5 wt. %, from 1 to 3 wt. %, from 3 to 10 wt. %, from 3 to 7 wt. %, from 3 to 5 wt. %, from 5 to 10 wt. %, or from 5 to 7 wt. % $K_2O$.

The Saudi Arabian volcanic ash functions as an extender, reducing the density of the lost circulation fluid and increasing the yield point of the lost circulation fluid. In embodiments, the lost circulation fluid may include from 9 to 45 wt. %, from 9 to 40 wt. %, from 9 to 35 wt. %, from 9 to 30 wt. %, from 9 to 25 wt. %, from 9 to 20 wt. %, from 9 to 15 wt. %, from 15 to 45 wt. %, from 15 to 40 wt. %, from 15 to 35 wt. %, from 15 to 30 wt. %, from 15 to 25 wt. %, from 15 to 20 wt. %, from 20 to 45 wt. %, from 20 to 40 wt. %, from 20 to 35 wt. %, from 20 to 30 wt. %, from 20 to 25 wt. %, from 25 to 45 wt. %, from 25 to 40 wt. %, from 25 to 35 wt. %, from 25 to 30 wt. %, from 30 to 45 wt. %, from 30 to 40 wt. %, from 30 to 35 wt. %, from 35 to 45 wt. %, from 35 to 40 wt. %, from 40 to 45 wt. %, or approximately 28 wt. % Saudi Arabian volcanic ash by weight of the lost circulation solution.

In some embodiments the lost circulation solution (and therefore the geopolymer barrier) may include a cement precursor material. The cement precursor material may be any suitable material which, when mixed with water, can be cured into a cement. The cement precursor material may be hydraulic or non-hydraulic. A hydraulic cement precursor material refers to a mixture of limestone, clay and gypsum burned together under temperatures greater than 1000° C. that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the geopolymer barrier of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an inter-ground addition. In other embodiments, the cement precursor material may be Saudi cement precursor, a combination of Portland cement precursor and crystalline silica, also known as quartz.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, other similar compounds, and combinations thereof. The cement precursor material may include Portland cement, siliceous fly ash, calcareous fly ash, slag cement, silica fume, quartz, any known cement precursor material or combinations of any of these. Silica flour is a finely ground crystalline silica with a molecular formula of $SiO_2$ and with a grain size ranging from 1 to 500 microns, from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

The geopolymer barrier may include Saudi Class G cement. Saudi Class G cement may include from 60 to 100 wt. %, from 60 to 99 wt. %, from 60 to 98 wt. %, from 60 to 97 wt. %, from 60 to 96 wt. %, from 60 to 95 wt. %, from 60 to 90 wt. %, from 60 to 80 wt. %, from 60 to 70 wt. %, from 70 to 100 wt. %, from 70 to 99 wt. %, from 70 to 98 wt. %, from 70 to 97 wt. %, from 70 to 96 wt. %, from 70 to 95 wt. %, from 70 to 90 wt. %, from 70 to 80 wt. %, from 80 to 100 wt. %, from 80 to 99 wt. %, from 80 to 98 wt. %, from 80 to 97 wt. %, from 80 to 96 wt. %, from 80 to 95 wt. %, from 80 to 90 wt. %, from 90 to 100 wt. %, from 90 to 99 wt. %, from 90 to 98 wt. %, from 90 to 97 wt. %, from 90 to 96 wt. %, from 90 to 95 wt. %, from 95 to 100 wt. %, from 95 to 99 wt. %, from 95 to 98 wt. %, from 95 to 97 wt. %, from 95 to 96 wt. %, from 96 to 100 wt. %, from 96 to 99 wt. %, from 96 to 98 wt. %, from 96 to 97 wt. %, from 97 to 100 wt. %, from 97 to 99 wt. %, from 97 to 98 wt. %, from 98 to 100 wt. %, from 98 to 99 wt. %, or from 99 to 100 Portland cement. Saudi Class G cement may include less than 40 wt. %, less than 30 wt. %, less than 20 wt. %, less than 10 wt. %, less than 5 wt. %, less than 4 wt. %, less than 3 wt. %, less than 2 wt. %, or less than 1 wt. % crystalline silica, or quartz. Saudi Class G cement may have a pH of greater than 7, of from 8 to 14, of from 10 to 13, of from 11 to 13, of from 12 to 13, or of 12.4. Saudi Class G cement may have a bulk density at 20° C. of from 70 to 120 lb/ft$^3$, of from 80 to 110 lb/ft$^3$, of from 90 to 100 lb/ft$^3$, or of 94 lb/ft$^3$. Saudi Class G cement may have a solubility in water of from 0.1 to 2 grams per 100 milliliters (g/100 ml), of from 0.1 to 1 g/100 ml, of from 0.1 to 0.8 g/100 ml, of from 0.1 to 0.5 g/100 ml, of from 0.2 to 2 g/100 ml, of from 0.2 to 1 g/100 ml, of from 0.2 to 0.8 g/100 ml, of from 0.2 to 0.5 g/100 ml, of from 0.4 to 2 g/100 ml, of from 0.4 to 1 g/100 ml, of from 0.4 to 0.8 g/100 ml, of from 0.4 to 0.5 g/100 ml, of from 0.5 to 2 g/100 ml, of from 0.5 to 1 g/100 ml, of from 0.5 to 0.8 g/100 ml, or of 0.5 g/100 ml.

The lost circulation solution may have a thickening time at 100° F. of greater than 1, 1.5, 1.75, 2, 2.5, 3, 5, 10, or 12 hours. The lost circulation solution may have a thickening time at 100° F. of less than 4.5, 5, 5.5, 6, 6.5, 7, 7.5, 8, 8.5, 9, 10, 11, 11.5, 12, 12.5, 13, or 15 hours. A thickening time test is used to simulate pumping conditions in order to determine a length of time before the cement becomes difficult or impossible to pump. The most common method to determine thickening time is via a pressurized consistometer. This device allows pressure and temperature to be applied to a lost circulation solution while it is being stirred (typically at 150 rpm). A resistor arm on a potentiometer indicates resistance to the paddle turning as the cement sets. The apparatus is calibrated to a standard output in Bearden Consistency units. The device is fully automated and can simulate squeeze schedules and/or batch mixing, etc. As stated previously, after the lost circulation solution has thickened, the lost circulation solution forms a geopolymer barrier.

The geopolymer barrier may have a density of from 100 to 140 pcf. In embodiments, the geopolymer barrier may have a density of from 100 to 130 pcf, from 100 to 120 pcf, from 100 to 115 pcf, from 100 to 110 pcf, from 100 to 105 pcf, from 105 to 140 pcf, from 105 to 130 pcf, from 105 to 120 pcf, from 105 to 115 pcf, from 105 to 110 pcf, from 110 to 140 pcf, from 110 to 130 pcf, from 110 to 120 pcf, from 110 to 115 pcf, from 115 to 140 pcf, from 115 to 130 pcf, from 115 to 120 pcf, from 120 to 140 pcf, from 120 to 130 pcf, or from 130 to 140 pcf. In embodiments, the geopolymer barrier may have a density of less than 140 pcf, less than 130 pcf, less than 120 pcf, less than 117 pcf, less than 115 pcf, or less than 110 pcf.

The viscosity of the geopolymer barrier compositions may be measured using a standard oilfield viscometer, such as a FANN® Model 35 viscometer manufactured by Fann Instrument Company for example, according to test methods provided in the API Recommended Practice For Field Testing Water-Based Cement (RP 13B-1/ISO 10414-1:3502). The viscometer reports shear stress readings at various shear rates. The shear stress readings are reported in units of pounds of force per 100 square feet (lbf/100 ft$^2$). The shear rate is measured in rpm. The viscometer may report shear stress readings at shear rates of at least one of 600 rpm, 300 rpm, 350 rpm, 100 rpm, 6 rpm, or 3 rpm. These shear stress readings may be used to determine the viscosity of the geopolymer barrier at any of the shear rates, using Equation 4, assuming a viscometer with an R1 rotor sleeve, B1 bob, and F1 torsion spring:

$$\mu = \frac{300}{N}\theta_N \qquad \text{Equation 4}$$

Where
μ=viscosity, (cp)
N=viscometer speed, shear rate (rpm)
$\theta_N$=viscometer reading, shear stress (lbf/100 ft$^2$)

The rheology of geopolymer barrier compositions may be modeled based on Bingham plastic flow behavior. In particular, the geopolymer barrier composition having Saudi Arabian volcanic ash behaves as a rigid body at lesser shear stress but flows as a viscous fluid at greater shear stress. The rheological behavior of the geopolymer barrier composition may be determined by measuring the shear stress on the geopolymer barrier composition at different shear rates, which may be accomplished by measuring the shear stress and/or shear rate on the geopolymer barrier composition using a FANN® Model 35 viscometer operated at 3 rpm, 6 rpm, 100 rpm, 350 rpm, 300 rpm, or 600 rpm, for example. A Bingham plastic fluid may be modeled by Equation 5.

$$\tau = (PV\dot{\gamma}) + 4.79YP \qquad \text{Equation 5}$$

Where
τ=shear stress, (dynes per square centimeter (dyne/cm$^2$))
PV=plastic viscosity, (cP)
$\dot{\gamma}$=shear rate, (s$^{-1}$)
YP=yield point, (lbf/100 ft$^2$)

The rheology of the geopolymer barrier composition may be evaluated from the plastic viscosity (PV) and the yield point (YP), which are parameters from the Bingham plastic rheology model. The PV is related to the resistance of the geopolymer barrier composition to flow due to mechanical interaction between the solids of the geopolymer barrier composition and represents the viscosity of the geopolymer barrier composition extrapolated to infinite shear rate. In other words, the PV is the slope of the shear stress versus shear rate curve of the Bingham plastic model. The PV reflects the type and concentration of the solids in the geopolymer barrier composition, and a lesser PV is preferred. The PV of the geopolymer barrier composition may be estimated by measuring the shear stress of the geopolymer barrier using a FANN® Model 35 viscometer at shear rates of 300 rpm and 600 rpm and subtracting the 300 rpm shear stress measurement from the 600 rpm shear stress measurement according to Equation 6.

$$PV = \theta_{600} - \theta_{300} \qquad \text{Equation 6}$$

Where
PV=plastic viscosity, (cP)
$\theta_{600}$=shear stress viscometer reading at 600 rpm, (lbf/100 ft$^2$)
$\theta_{300}$=shear stress viscometer reading at 300 rpm, (lbf/100 ft$^2$)

When the shear stress measurement at 600 rpm is not available, the plastic viscosity may be calculated by determining the difference between any two shear stress measurements, dividing the difference by the difference of the shear rates that the two shear stresses were measured at, and multiplying that factor by 300. This formula is provided in Equation 7.

$$PV = \frac{300}{N_2 - N_1}(\theta_{N_2} - \theta_{N_1}) \qquad \text{Equation 7}$$

Where
PV=plastic viscosity, (cP)
N=viscometer speed, shear rate (rpm)
$\theta_N$=shear stress viscometer reading at N rpm, (lbf/100 ft$^2$)

The YP represents the shear stress less than which the geopolymer barrier composition behaves as a rigid body and greater than which the geopolymer barrier composition flows as a viscous fluid. In other words, the YP represents the amount of stress required to move the geopolymer barrier composition from a static condition. The yield point is the resistance of initial flow of a fluid, or the stress required in order to move the fluid. It can be simply stated that the yield point is the attractive force among colloidal particles in geopolymer barrier. The YP of a geopolymer barrier composition is correlated with the capacity of the geopolymer barrier composition to carry rock cuttings through the annulus, which in simplified terms indicates the geopolymer barrier composition's hole-cleaning ability. Yield point affects both the start-up pressure after a temporary shut-down and the void filling properties of cements during cementing operations. YP of equal to or greater than 15 lbf/100 ft$^2$ is considered acceptable for drilling. The YP is determined by extrapolating the Bingham plastic rheology model to a shear rate of zero. In other words, the PV is the y-intercept of the shear stress v. shear rate curve of the Bingham plastic model. The YP of the geopolymer barrier composition may be estimated from the PV from Equation 7 by subtracting the PV from Equation 7 from the shear stress of the geopolymer barrier measured at 300 rpm according to Equation 8.

$$YP = \theta_{300} - PV \qquad \text{Equation 8}$$

The YP is expressed as a force per area, such as in field units of lbf/100 ft$^2$, for example. The YP may be converted to SI units of dyne/cm$^2$, as 1 lbf/100 ft$^2$=4.79 dyne/cm$^2$.

The geopolymer barrier may have a plastic viscosity of from 50 to 350 cP. In other embodiments, the geopolymer barrier may have a plastic viscosity of from 50 to 350 cP, from 50 to 300 cP, from 50 to 350 cP, from 50 to 150 cP, from 50 to 125 cP, from 50 to 100 cP, from 50 to 80 cP, from 50 to 60 cP, from 60 to 350 cP, from 60 to 300 cP, from 60 to 350 cP, from 60 to 150 cP, from 60 to 125 cP, from 60 to 100 cP, from 60 to 80 cP, from 80 to 350 cP, from 80 to 300 cP, from 80 to 350 cP, from 80 to 150 cP, from 80 to 125 cP, from 80 to 100 cP, from 100 to 350 cP, from 100 to 300 cP, from 100 to 350 cP, from 100 to 150 cP, from 100 to 125 cP, from 100 to 100 cP, from 100 to 80 cP, from 125 to 350 cP, from 125 to 300 cP, from 125 to 350 cP, from 125 to 150 cP, from 150 to 350 cP, from 150 to 300 cP, from 150 to 350 cP, from 350 to 300 cP, from 350 to 350 cP, or from 300 to 350 cP.

The geopolymer barrier of the present disclosure may have a yield point of from 5 to 70 lbf/100 ft$^2$, from 5 to 60 lbf/100 ft$^2$, from 5 to 55 lbf/100 ft$^2$, from 5 to 40 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 70 lbf/100 ft$^2$, from 10 to 60 lbf/100 ft$^2$, from 10 to 55 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 70 lbf/100 ft$^2$, from 15 to 60 lbf/100 ft$^2$, from 15 to 55 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 70 lbf/100 ft$^2$, from 20 to 60 lbf/100 ft$^2$, from 20 to 55 lbf/100 ft$^2$, from 20 to 40 lbf/100 ft$^2$, from 20 to 30 lbf/100 ft$^2$, from 20 to 25 lbf/100 ft$^2$, from 25 to 70 lbf/100 ft$^2$, from 25 to 60 lbf/100 ft$^2$, from 25 to 55 lbf/100 ft$^2$, from 25 to 40 lbf/100 ft$^2$, from 25 to 30 lbf/100 ft$^2$, from 30 to 70 lbf/100 ft$^2$, from 30 to 60 lbf/100 ft$^2$, from 30 to 55 lbf/100 ft$^2$, from 30 to 40 lbf/100 ft$^2$, from 40 to 70 lbf/100 ft$^2$, from 40 to 60 lbf/100 ft$^2$, from 40 to 55 lbf/100 ft$^2$, from 55 to 70 lbf/100 ft$^2$, from 55 to 60 lbf/100 ft$^2$, or from 60 to 70 lbf/100 ft$^2$.

The gel strength of a geopolymer barrier refers to the shear stress of the geopolymer barrier composition measured at a low shear rate (such as 3 rpm or 6 rpm) following a defined period of time during which the geopolymer barrier composition is maintained in a static state. The shear stress of the geopolymer barrier composition at low shear rate may be measured using a standard oilfield viscometer, such as a FANN® Model 35 viscometer operated at low rpms, such as at 3 rpm or 6 rpm, according to the test methods described in API Recommended Practice For Field Testing Water-Based Cement (RP 13B-1/ISO 10414-1:3502) published August 2014 and incorporated by reference into this disclosure in its entirety. To measure the gel strength, the geopolymer barrier composition is first stirred by contacting the geopolymer barrier composition with the spindle of the viscometer and operating the viscometer at 600 rotations per minute (rpm). The viscometer is then turned off for period of time (time period). For a 10-second gel strength, the time period is 10 seconds, and for a 10 minute gel strength, the time period is 10 minutes. It should be understood that other time periods for measuring gel strength may be used as reference times for measurements of gel strength. During the time period, the geopolymer barrier composition comes to rest in a static state. Upon expiration of the time period, the viscometer is turned back on at a low speed, such as 3 rpm for example, to generate a low shear rate. The viscometer reading is then taken. The gel strength of the geopolymer barrier composition is reported in units of lbf/100 ft$^2$.

The geopolymer barrier described in this disclosure may have a 10-second gel strength of from 5 to 50 lbf/100 ft$^2$, from 5 to 40 lbf/100 ft$^2$, from 5 to 35 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 50 lbf/100 ft$^2$, from 10 to 40 lbf/100 ft$^2$, from 10 to 35 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 50 lbf/100 ft$^2$, from 15 to 40 lbf/100 ft$^2$, from 15 to 35 lbf/100 ft$^2$, from 15 to 30 lbf/100 ft$^2$, from 15 to 25 lbf/100 ft$^2$, from 15 to 20 lbf/100 ft$^2$, from 20 to 50 lbf/100 ft$^2$, from 20 to 40 lbf/100 ft$^2$, from 20 to 35 lbf/100 ft$^2$, from 20 to 30 lbf/100 ft$^2$, from 20 to 25 lbf/100 ft$^2$, from 25 to 50 lbf/100 ft$^2$, from 25 to 40 lbf/100 ft$^2$, from 25 to 35 lbf/100 ft$^2$, from 25 to 30 lbf/100 ft$^2$, from 30 to 50 lbf/100 ft$^2$, from 30 to 40 lbf/100 ft$^2$, from 30 to 35 lbf/100 ft$^2$, from 35 to 50 lbf/100 ft$^2$, from 35 to 40 lbf/100 ft$^2$, or from 40 to 50 lbf/100 ft$^2$.

The geopolymer barrier may have a 10 minute gel strength of from 10 to 60 lbf/100 ft$^2$, from 10 to 50 lbf/100 ft$^2$, from 10 to 45 lbf/100 ft$^2$, from 10 to 40 lbf/100 ft$^2$, from 10 to 30 lbf/100 ft$^2$, from 10 to 25 lbf/100 ft$^2$, from 10 to 20 lbf/100 ft$^2$, from 10 to 15 lbf/100 ft$^2$, from 15 to 60 lbf/100 ft$^2$, from 15 to 50 lbf/100 ft$^2$, from 15 to 45 lbf/100 ft$^2$, from 15 to 40 lbf/100 ft$^2$, from 15 to 30 lbf/100 ft$^2$, from 15 to 25 lbf/100 ft$^2$, from 15 to 20 lbf/100 ft$^2$, from 20 to 60 lbf/100 ft$^2$, from 20 to 50 lbf/100 ft$^2$, from 20 to 45 lbf/100 ft$^2$, from 20 to 40 lbf/100 ft$^2$, from 20 to 30 lbf/100 ft$^2$, from 20 to 25 lbf/100 ft$^2$, from 25 to 60 lbf/100 ft$^2$, from 25 to 50 lbf/100 ft$^2$, from 25 to 45 lbf/100 ft$^2$, from 25 to 40 lbf/100 ft$^2$, from 25 to 30 lbf/100 ft$^2$, from 30 to 60 lbf/100 ft$^2$, from 30 to 50 lbf/100 ft$^2$, from 30 to 45 lbf/100 ft$^2$, from 30 to 40 lbf/100 ft$^2$, from 35 to 60 lbf/100 ft$^2$, from 35 to 50 lbf/100 ft$^2$, from 35 to 45 lbf/100 ft$^2$, from 40 to 60 lbf/100 ft$^2$, from 40 to 50 lbf/100 ft$^2$, from 40 to 45 lbf/100 ft$^2$, from 45 to 60 lbf/100 ft$^2$, from 45 to 50 lbf/100 ft$^2$, or from 50 to 60 lbf/100 ft$^2$.

EXAMPLES

Example 1

Wavelength Dispersive X-ray Fluorescence (WDXRF) may be used to conduct elemental analysis. In WDXRF spectrometers, all of the elements in the sample are excited simultaneously. The different energies of the characteristic radiation emitted from the sample are diffracted into different directions by an analyzing crystal or monochromater (similar to the action of a prism dispersing different colors of visible light into different directions). By placing the detector at a certain angle, the intensity of X-rays with a certain wavelength can be measured. Sequential spectrometers use a moving detector on a goniometer to move it through an angular range to measure the intensities of many different wavelengths. Simultaneous spectrometers are equipped with a set of fixed detection systems, where each system measures the radiation of a specific element.

For the WDXRF analysis, a sample of Saudi Arabian volcanic ash was homogenized and manually grounded by an agate mortar and a pestle for several minutes to achieve fine particle size. Then, 4 grams of the Saudi Arabian volcanic ash powder was mixed well and homogenized with 0.9 grams of a binder (Licowax C micropowder PM (Hoechstwax)). Then, the powder was pressed with 20 tons of pressure to a pellet with 31 millimeter (mm) diameter. WDXRF analysis was then performed on the sample using the standardless Omnian 27 method. The composition is shown in Table 1 to be presented.

TABLE 1

| Composition of Saudi Arabian Volcanic Ash | |
|---|---|
| Element | Wt. % |
| O | 44.2 |
| Si | 21.8 |
| Al | 8.5 |
| Fe | 8.5 |
| Ca | 6.4 |
| Mg | 4.2 |
| Na | 3.1 |
| Ti | 1.5 |
| K | 1.0 |
| P | 0.3 |
| Mn | 0.1 |

The WDXRF results show that the sample consisted of mainly O and Si with appreciable amounts of Al, Fe, Ca, Mg, and Na.

Example 2

X-ray powder diffraction (XRD) is a rapid analytical technique primarily used for phase identification of a crystalline material and can provide information on unit cell dimensions. The analyzed material is finely ground, homogenized, and average bulk composition is determined. X-ray diffractometers consist of three basic elements: an X-ray tube, a sample holder, and an X-ray detector. X-rays are generated in a cathode ray tube by heating a filament to produce electrons, accelerating the electrons toward a target by applying a voltage, and bombarding the target material with electrons. When electrons have sufficient energy to dislodge inner shell electrons of the target material, characteristic X-ray spectra are produced. These spectra consist of several components, the most common being $K_\alpha$ and $K_\beta$. $K_\alpha$ consists, in part, of $K_{\alpha 1}$ and $K_{\alpha 2}$. $K_{\alpha 1}$ has a slightly shorter wavelength and twice the intensity as $K_{\alpha 2}$. The specific wavelengths are characteristic of the target material (Cu, Fe, Mo, Cr). Filtering, by foils or crystal monochrometers, is required to produce the monochromatic X-rays needed for diffraction. $K_{\alpha 1}$ and $K_{\alpha 2}$ are sufficiently close in wavelength such that a weighted average of the two is used. These X-rays are collimated and directed onto the sample. As the sample and detector are rotated, the intensity of the reflected X-rays is recorded. A detector records and processes this X-ray signal and converts the signal to a count rate which is then output to a device such as a printer or computer monitor.

For the XRD analysis, a sample of Saudi Arabian volcanic ash was homogenized and manually grounded by an agate mortar and a pestle for several minutes to achieve fine particle size. Then, 4 grams of the fine Saudi Arabian volcanic ash powder was mounted into the XRD sample holder by back pressing. XRD was then performed on the sample using the SALAM 014 method. The composition is shown in Table 2 to be presented.

TABLE 2

| XRD Composition of Saudi Arabian Volcanic Ash | |
|---|---|
| Compound | Wt. % |
| Amorphous Material | 70 |
| Labradorite: $Ca_{0.65}Na_{0.32}(Al_{1.62}Si_{2.38}O_8)$ | 19 |
| Augite: $Ca(Fe, Mg)Si_2O_6$ | 6 |
| Forsterite: $Mg_2SiO_4$ | 5 |

The XRD results show that the sample consisted mainly of amorphous material with appreciable amounts of labradorite, augite, and forsterite. The WDXRF results confirmed the XRD findings.

Example 3

Formulating the Resin Based LCM with a Coarse Saudi Arabian Volcanic Ash:

For developing the present LCM formulation we mixed an epoxy resin (RAZEEN 2254) with the curing agent diethylenetriamine with a coarse Saudi Arabian volcanic ash at room temperature in the following amounts: 50 grams (g) Razeen 2254, 2 g Razeencure 931, and 20 g Saudi Arabian volcanic ash having a $D_{10}$ particle size distribution of 368 µm, a $D_{50}$ particle size distribution of 540.6 µm, and a $D_{90}$ particle size distribution of 788 µm. Razeen 2254 is bisphenol-A-epichlorohydrin epoxy resin with the reactive diluent oxirane mono [(C12-C14)-alkyloxy) methyl] derivatives, is the epoxy resins obtained from Jana Chemicals company. Razeencure 931 is diethylenetriamine crosslinker available from Jana Chemicals. The Saudi Arabian volcanic ash was obtained locally from Saudi Arabia. The visual observed thickening time for the above formulation was 6 hours and 5 minutes.

Example 4

Testing the Epoxy Resin Formulation at High Pressure and Temperature

The epoxy resin formulation with the curing agent was tested before formulating the LCM in order to acquire the target thickening time as well as to test the formulation at high pressure and temperature. This was done by preparing two different resin samples. The formulations are given in Table 3 below. Experiments were performed at a test temperature of 223° F. and pressure of 5700 psi. The additives were batch mixed for a time period of 30 minutes.

Thickening time tests were performed on all the resin samples. Thickening time test is designed to determine the length of time a cement slurry remains in a pumpable, fluid state under simulated wellbore conditions of temperature and pressure. The tests were performed using a Chandler Engineering Consistometer Model 8340 according to API Spec 10 Code Schedule (1), API Recommended Practice 10B-2, and the Chandler Engineering Instruction Manual. Thickening time is measured in Bearden units (Bc). Fully set cement is considered to have a consistency of 100 Bc. However, 70 Bc is the maximum pumpable consistency. Usually, low consistency period can last few hours depending on the required conditions and cement slurry compositions until it begins to set by reaching 100 Bc.

TABLE 3

Thickening time results of the resin samples:

|  | Example 1 | Example 2 |
|---|---|---|
| Additives |  |  |
| RAZEEN 2254 | 100 g | 100 g |
| Razeencure 931 (Crosslinker) | 2.5 g | 3 g |
| Test parameters |  |  |
| Final Pressure | 5700 psi | 5700 psi |
| Test Temperature | 223° F. | 223° F. |
| Depth | 13500 ft | 13500 ft |
| BC Final | 100 Bc | 100 Bc |
| Thickening time | 11 hours and 33 minutes | 4 hours and 20 minutes |

Example 1 with a 2.5 g of Razeencure 931 shows a thickening time of 11 hours and 33 minutes whereas Examples 2 with Razeencure concentration of 3 g shows a thickening time of 4 hours and 20 minutes. The results show that as the concentration of the crosslinker increases the thickening subsequently decreases.

It is noted that one or more of the following claims utilize the term "where" or "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents. Unless otherwise stated within the application, all tests, properties, and experiments are conducted at room temperature and atmospheric pressure.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of reducing lost circulation comprising:
  introducing a lost circulation solution comprising Saudi Arabian volcanic ash, a curing agent, and a resin into a subsurface formation through a wellbore, wherein the Saudi Arabian volcanic ash comprises $SO_3$, $CaO$, $SiO_2$, $Al_2O_3$, $Fe_2O_3$, $MgO$, and $K_2O$ and has a particle size of from 300 to 800 μm; and allowing the lost circulation solution to thicken within the subsurface formation, thereby forming a geopolymer barrier between the subsurface formation and the wellbore to reduce lost circulation.

2. The method of claim 1, wherein the lost circulation solution comprises from 50 to 90 wt. % resin.

3. The method of claim 1, wherein the resin comprises phenol, furan, epoxy, urethane, phenol-formaldehyde, polyester, vinyl ester, urea aldehyde, novolac, resole, bisphenol-A-epichlorohydrin epoxy resin or combinations thereof.

4. The method of claim 1, wherein the lost circulation solution comprises from 1 to 5 wt. % curing agent.

5. The method of claim 1, wherein the curing agent comprises a crosslinker.

6. The method of claim 5, wherein the crosslinker comprises diethylenetriamine, hexamethylenetetramine, paraformaldehyde, oxazolidines, melamine resins, aldehyde donors, resole polymers, or combinations thereof.

7. The method of claim 1, wherein the lost circulation solution comprises from 9 to 45 wt. % Saudi Arabian volcanic ash.

8. The method of claim 1, wherein the Saudi Arabian volcanic ash is free of $TiO_2$.

9. The method of claim 1, wherein the Saudi Arabian volcanic ash comprises from 40 wt. % to 50 wt. % $SiO_2$ and from 10 wt. % to 20 wt. % $Al_2O_3$.

10. The method of claim 1, wherein the Saudi Arabian volcanic ash comprises:
from 0.05 wt. % to 0.2 wt. % $SO_3$;
from 5 wt. % to 10 wt. % CaO;
from 40 wt. % to 50 wt. % $SiO_2$;
from 10 wt. % to 20 wt. % $Al_2O_3$;
from 10 wt. % to 15 wt. % $Fe_2O_3$;
from 5 wt. % to 10 wt. % MgO; and
from 0.5 wt. % to 5 wt. % $K_2O$.

11. The method of claim 1, wherein the lost circulation solution further comprises an aqueous solution.

12. The method of claim 11, wherein the aqueous solution comprises deionized water, tap water, fresh water, salt water, natural or synthetic brine, municipal water, formation water, produced water, well water, filtered water, distilled water, sea water, or combinations thereof.

13. The method of claim 11, wherein the lost circulation solution further comprises a cement precursor material comprising one or more components selected from the group consisting of calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO.Al_2O_3.Fe_2O_3$), gypsum ($CaSO_4.2H_2O$), sodium oxide, potassium oxide, lime (calcium oxide), hexavalent chromium, trivalent chromium, calcium aluminate, and combinations thereof.

14. The method of claim 1, wherein the lost circulation solution further comprises one or more additives selected from the group consisting of dispersants, fluid loss control agents, retarders, expansion additives, antifoaming agents, stabilisers, accelerators, extenders, weighting agents, lost circulation control agents, surfactants, gypsum, hematite, manganese tetroxide, silica flour, and silica sand.

15. The method of claim 1, wherein the lost circulation solution has a thickening time of less than 12 hours.

16. The method of claim 1, wherein the lost circulation solution has a thickening time of less than 5 hours.

* * * * *